United States Patent [19]

Cheng

[11] Patent Number: 5,301,250

[45] Date of Patent: Apr. 5, 1994

[54] OPTICAL FIBER TERMINATOR

[76] Inventor: Yu F. Cheng, No. 7, Fu Hsing St., Tu Cheng Hsiang, Taipei Hsien, Taiwan

[21] Appl. No.: 49,763

[22] Filed: Apr. 19, 1993

[51] Int. Cl.$^5$ .............................................. G02B 6/26
[52] U.S. Cl. ........................................ 385/76; 385/77; 385/81
[58] Field of Search ................ 385/76, 77, 78, 81, 385/55, 58, 60, 62, 63, 66

[56] References Cited

U.S. PATENT DOCUMENTS

| | | | |
|---|---|---|---|
| 4,327,964 | 5/1982 | Haesly et al. | 385/55 |
| 4,787,695 | 11/1988 | Laor | 385/78 |
| 5,044,719 | 9/1991 | Nakamura | 385/76 |
| 5,216,733 | 6/1993 | Nagase et al. | 385/78 X |

Primary Examiner—Rodney B. Bovernick
Assistant Examiner—Stephen W. Barns
Attorney, Agent, or Firm—Merchant, Gould, Smith, Edell, Welter & Schmidt

[57] ABSTRACT

An optical fiber connector has a tubular housing which has a slot formed through a corresponding upper periphery and lower periphery thereof. A securing plate is allowed to be positioned inside the slot with two distal ends thereof substantially protruding slightly out of the slot. A substantially elliptical hole is formed at the center of the plate with the longer axis thereof in substantially horizontal direction allowing to be penetrated by a fiber.

2 Claims, 3 Drawing Sheets

OPTICAL FIBER TERMINATOR

BACKGROUND OF THE INVENTION

This invention relates to an optical fiber connector for easy installation and manufacture.

A conventional optical fiber connector shown in FIG. 6 includes a housing 6 having an isolating protruding plate 60 formed therein and isolating the housing to a first compartment 61 and a second compartment 62. The two compartments 61 and 62 are in communication with each other allowing a fiber cable 5 to pass in a deformed way. A cover 7 having a corresponding complementary structure to the compartments 61, 62 of the housing 6 is securely engaged to the housing as shown in FIG. 5. The conventional fiber connector can fix the fiber securely. However, to install the fiber in the connector is cumbersome and manufacture of the connector is difficult because of the complicated structures of the cover 7. Therefore, it is requisite to invent a new fiber connector which is allowed to firmly secure the fiber easily and also has a simple structure for easy manufacture.

SUMMARY OF THE INVENTION

It is an object of the present invention to provide an optical fiber connector.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
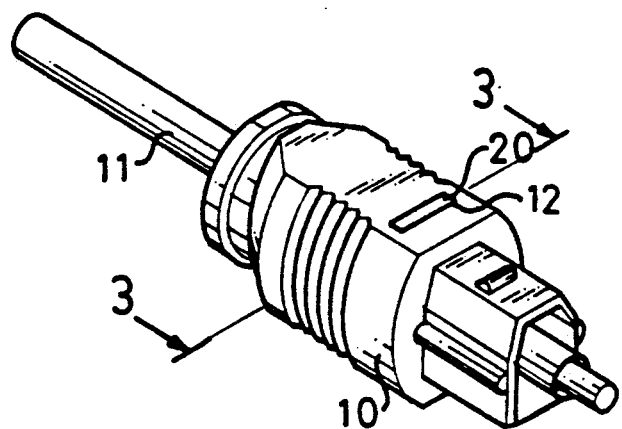
FIG. 1 is a perspective view of an optical fiber connector having a fiber received with a fiber therethrough.
Figure 2:
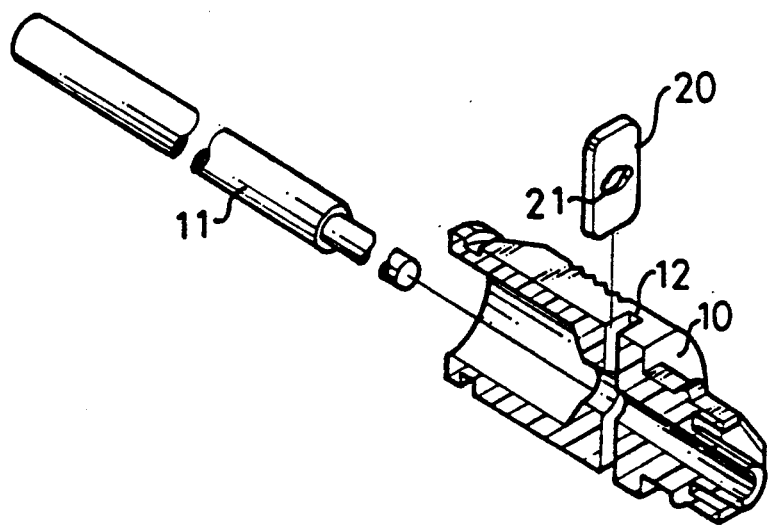
FIG. 2 is an exploded partially sectional view of FIG. 1.
Figure 3:
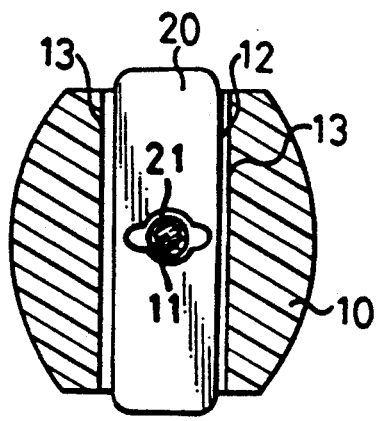
FIG. 3 is an enlarged sectional view taken from lines 3—3 of FIG. 1 illustrating a securing plate of the connector.
Figure 4:
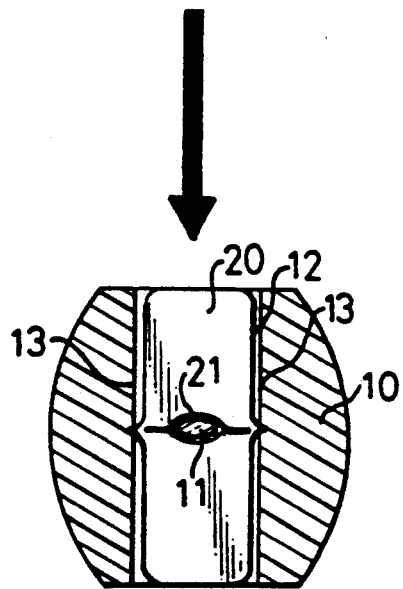
FIG. 4 is a similar view of FIG. 3 except that the securing plate has pressure applied from both upper sides and lower sides thereof.
Figure 5:
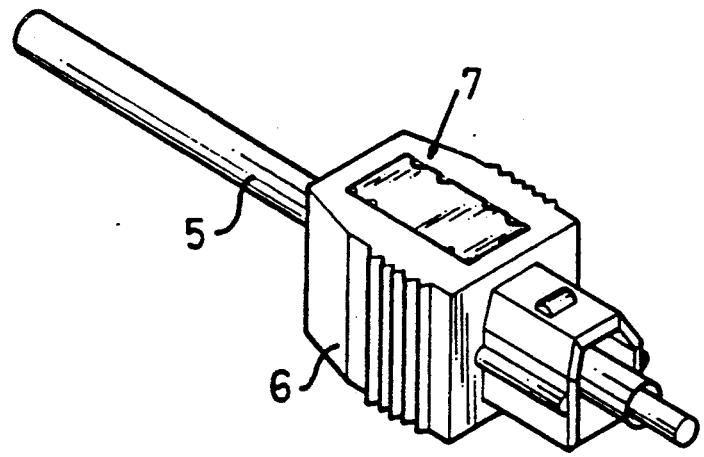
FIG. 5 is a conventional optical fiber connector firmly receiving a fiber therethrough.
Figure 6:
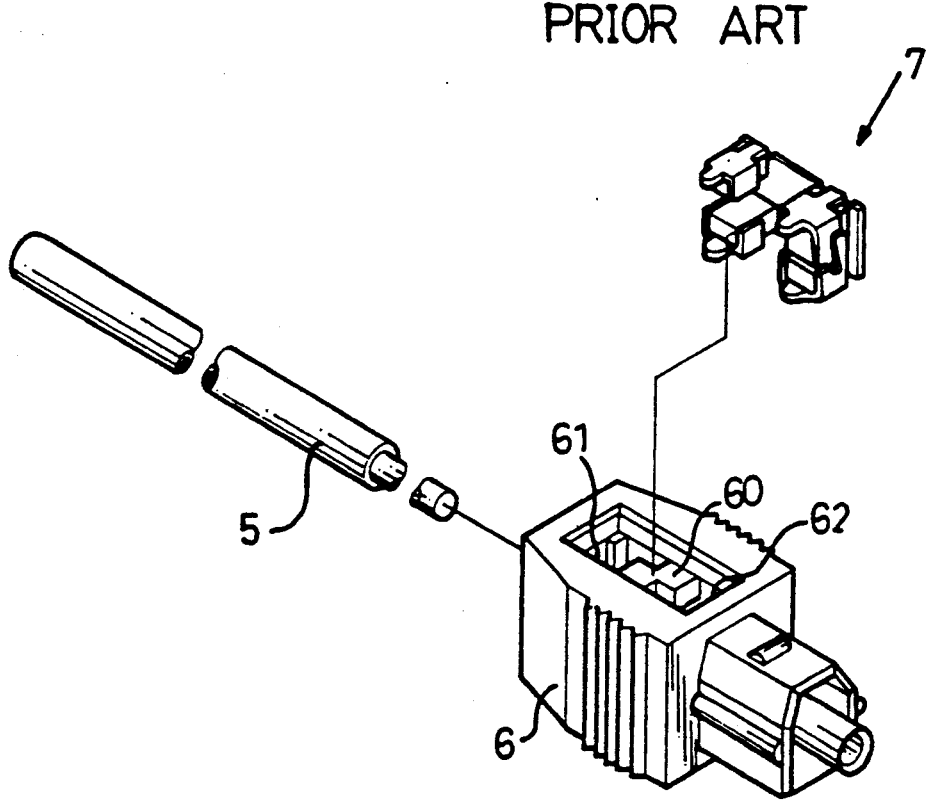
FIG. 6 is an exploded view of the conventional optical fiber connector as shown in FIG. 5.

Referring to FIGS. 1 and 2, an optical fiber connector comprises a tubular housing 10, a slot 12 formed through a corresponding upper periphery and lower periphery of the housing 10, and a securing plate 20 allowed to be positioned inside the housing 10 with two distal ends thereof substantially protruding slightly out of the slot 12. Referring to FIG. 3, the slot 12 has a horizontal width thereof defined by the distance of two opposite walls 13 in the housing 10. The horizontal width of the slot 12 is marginally greater than the width of the securing plate 20, thus allowing the plate 20 to vertically slide therethrough. A substantially elliptical hole 21 is formed at the center of the plate 20 with the longer axis thereof in substantially horizontal direction. In assembling, firstly, the plate 20 is inserted into the slots 12; secondly, the fiber 11 is inserted through the hole 21; thirdly the plate 20 has the two distal sides thereof protruding from the slot 12; fourthly, a press machine or the like is used to apply vertical pressure on upper and lower sides of the plate 20 as shown in FIG. 4, thus firmly fixing the fiber 11 in the hole 21 and fixing the plate 20 in the housing 10. As shown in FIG. 4, when the plate 20 receives pressure from top and bottom sides thereof, the vertical length thereof is shortened and the horizontal width especially near the hole 21 is enlarged; the hole 21 is deformed to be smaller thus firmly securing the fiber 11; and two sides of the plate 20 near the hole 21 are deformed to protrude outward laterally thus firmly contacting against the inner walls 13 of the housing 10.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An optical fiber connector comprising a tubular housing (10), a slot (12) formed through a corresponding upper periphery and lower periphery of said housing (10), and a securing plate (20) being positioned inside said slot (12) with two distal ends of the plate substantially protruding slightly out of said slot (12), a substantially elliptical hole (21) being formed at the center of said plate (20) with the longer axis thereof in substantially horizontal direction.

2. An optical fiber connector comprising a tubular housing (10), a slot (12) formed through a corresponding upper periphery and lower periphery of said housing (10), and a securing plate (20) being firmly positioned inside said slot (12) with two distal ends of the plate substantially mating with two ends of said slot (12), a hole (21) being formed at the center of said plate (20) for firmly securing a fiber (11) therethrough.

* * * * *